T. F. TOMLINSON.
SIDE BEARING FOR CAR TRUCKS.
APPLICATION FILED MAY 19, 1915.
1,196,178. Patented Aug. 29, 1916.
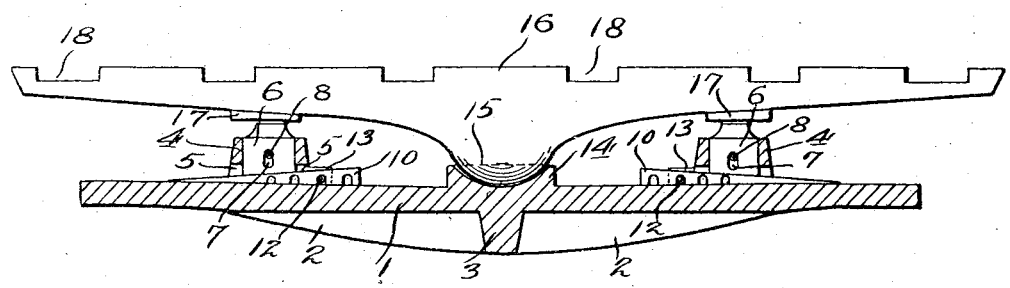
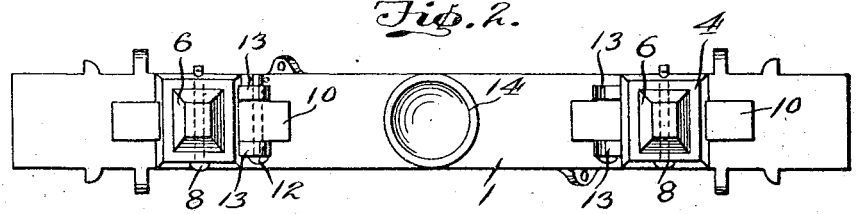
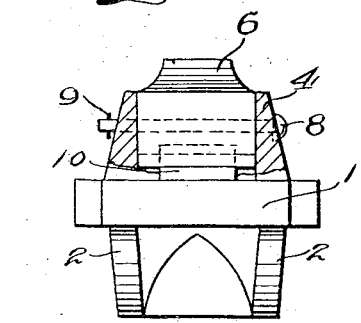
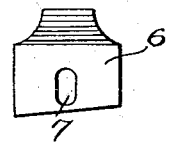
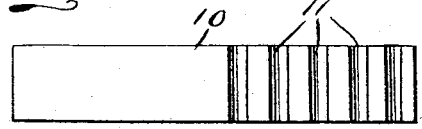
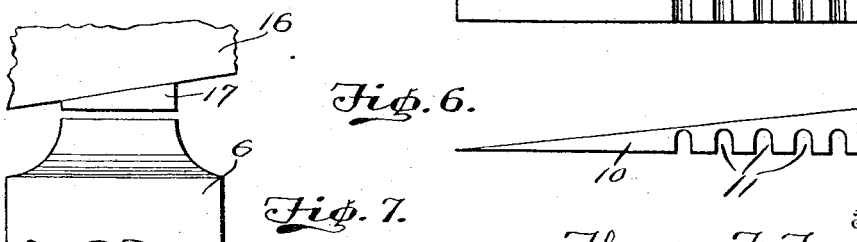
Inventor
Thomas F. Tomlinson
Witnesses
Edw. S. Hall.
B. F. Garvey Jr.
By Richard B. Owen.
Attorney

UNITED STATES PATENT OFFICE.

THOMAS F. TOMLINSON, OF NORFOLK, VIRGINIA.

SIDE BEARING FOR CAR-TRUCKS.

1,196,178. Specification of Letters Patent. Patented Aug. 29, 1916.

Application filed May 19, 1915. Serial No. 29,180.

*To all whom it may concern:*

Be it known that I, THOMAS F. TOMLINSON, a citizen of the United States, residing at Norfolk, in the county of Norfolk and State of Virginia, have invented certain new and useful Improvements in Side Bearings for Car-Trucks, of which the following is a specification.

This invention relates to car trucks and has especial reference to the side bearings thereof.

An object of this invention is to provide side bearings, which are adjustable to take up the wear, and are detachable to permit substitution should they be rendered unsuitable for use, or may be disengaged for readjustment, and replaced at will.

Other objects as well as the nature, characteristic features and scope of my invention will be more readily understood from the following description taken in connection with the accompanying drawings and pointed out in the claims forming a part of this specification.

Referring to the drawings: Figure 1 is a longitudinal sectional view of a truck bolster, and side elevational view of a body bolster constructed in accordance with my invention, and illustrating the application of my improved bearings thereto, Fig. 2 is a top plan view of a truck bolster embodying my invention, Fig. 3 is an elevational view of the truck bolster used in this invention, illustrating the application of my improved bearing, a portion of the bolster being broken away to disclose the bearing block, Fig. 4 is a side elevational view of one of the bearing blocks, used in the present invention. Fig. 5 is a top plan view of the bearing block actuating member, Fig. 6 is a side elevational view of the same, and Fig. 7 is a detail enlarged fragmentary view of the body bolster, and one of the bearing blocks, illustrating to advantage the manner in which they are spaced under normal conditions.

In the drawings, a truck bolster 1 is provided which in the present instance is provided on its under face with integrally formed parallel ribs 2, the latter being enlarged and engaged approximately midway the ends of said bolster with a web portion 3, thereby providing an apt reinforcing medium, the point of potential strength being in the center of the truck, directly subjacent the bearing point of the body bolster. The upper face of the truck bolster 1 has housings 4 integrally formed thereon, the latter being spaced from each other and arranged in proximity to the opposite terminals of the truck bolster, as illustrated to advantage in Fig. 1. It will be noted that each of the housings 4 is provided with diametrically opposite openings 5, these being formed in two opposite sides of each of the housings, at the jointure of the latter with the said bolster.

Bearing blocks 6 are mounted in each housing 4, and are provided with elongated slots 7 therein which are adapted for the reception of bolts 8, whereby casual displacement of the bearing blocks from the housing 4 is precluded. The bolts 8 are held from displacement by cotter pins 9, although any other suitable means may be used if so desired, since it is, of course, understood that the bolts 8 will be passed through the slots 7 in the bearing blocks 6, and through complemental openings in opposite sides of the housings 4, thereby permitting adjustment of the bearing blocks 6 when pressure is applied to the bottom faces of the latter, to force the blocks upwardly through the housings, but at the same time, limiting the upward movement of said blocks.

In order to elevate the bearing blocks 6 in the housings 4, a member 10 is provided, which in this instance is of a wedge-shaped configuration and is provided in one face with equidistantly spaced transverse recesses 11, the latter adapted to receive a bolt 12, said bolt being utilized for holding the wedge-shaped member 10 in a predetermined position, consistent with the point of desirability at which the bearing blocks are to be retained. It will be noted that each bolt 12 passes through parallel ears 13 on the upper face of the truck bolster 1 and contiguous with the inner faces of the housings 4. The wedge members 10 are adapted for engagement through the openings 5 in the housings 4, beneath the bearing blocks 6, and are further adapted for contact with the complementally inclined inner terminals of the bearing blocks 6, whereby said blocks are elevated by advancement of the members 10 therebeneath.

A portion of the upper face of the truck bolster 1 is enlarged to provide a semi-spherical bearing cup 14, the latter adapted for engagement with a semi-spherical enlargement 15 on the body-bolster 16, thereby permitting vertical movement of the ends of said body-bolster, on the hemispherical enlargement 15, as mentioned. The movement of the ends of the body-bolster is, of course, limited, in view of the bearing blocks 6, heretofore described, the latter lying under normal conditions in close proximity to abutments 17 on the lower face of the body-bolster. The upper face of the body-bolster is provided with the usual sill recesses 18.

From the above, it is obvious that the body-bolster will have movement on the truck-bolster, to permit play of the rolling stock while passing around curves, etc., at the same time, preventing undue movement of the body-bolster on the truck-bolster, at all times. It is, of course, understood that when it is desired to elevate the bearing blocks 6, pressure is exerted upon the wedge-shaped members 10, forcing the same inwardly, and when the desired point of adjustment has been reached, the bolts 12 are engaged through the openings in the ears 13 and the transverse grooves 11 in the members 10, so as to hold the latter from casual displacement. Should it be desired to remove the bearing blocks from the housings 4, the bolts 8 are first removed, after which the bearing blocks may be readily extracted and substituted by new ones, or else filed down in the usual way.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

Having thus fully described my invention, what I claim as new and desire to secure by Letters Patent is:

1. A side bearing for car trucks in combination with companion bolsters, consisting of housings formed on one of said bolsters, bearing blocks movably and detachably mounted in said housings, a wedge-shaped member slidable through each housing and beneath each of the bearing blocks, to adjust the latter for positioning at all times in predetermined proximity to the bolster, whereby movement of the latter is limited, and a bolt in connection with each housing and engaged with the wedge-shaped member thereof to hold the same in a predetermined adjusted position.

2. A side bearing for car trucks, in combination with superposed companion bolsters consisting of housings formed on the lower of said bolsters adjacent the terminals of the latter, each of which is equipped with ears, a bearing block mounted in each of said housings and vertically movable therein for normal positioning in proximity to the other bolster, to limit the movement of the latter, a wedged member slidable beneath each of said bearing blocks to elevate the same, and a retaining bolt associated with each member and adapted for coöperation with said ears to hold the wedged member in a fixed position.

In testimony whereof I affix my signature in presence of two witnesses.

THOMAS F. TOMLINSON.

Witnesses:
W. H. VENABLE,
R. E. MILLER.

Copies of this patent may be obtained for five cents each, by addressing the "Commissioner of Patents, Washington, D. C."